United States Patent [19]

Stewart et al.

[11] Patent Number: 4,749,825

[45] Date of Patent: Jun. 7, 1988

[54] FACSIMILE AND RADIO TELETYPE BROADCAST SIGNAL DECODER

[76] Inventors: Scott Stewart, 1034 Hillside Ave., Madison, Wis. 53705; Edwin W. Eloranta, 2520 Lunde La., Mt. Horeb, Wis. 53572

[21] Appl. No.: 32,867

[22] Filed: Mar. 31, 1987

[51] Int. Cl.⁴ ............................................. H04L 21/04
[52] U.S. Cl. .................................................. 178/4.1 A
[58] Field of Search .............. 178/23 R, 4.1 R, 4.1 A; 358/280, 263, 268

[56] References Cited

U.S. PATENT DOCUMENTS

4,243,836 1/1981 Scharfe ............................ 178/4.1 R

Primary Examiner—Stafford D. Schreyer
Attorney, Agent, or Firm—Mason, Kolehmainen, Rathburn & Wyss

[57] ABSTRACT

A method and apparatus are provided for decoding both radio facsimile and radio teletype broadcast signals. A zero crossing detector detects zero crossings of the broadcast signal and generates a pulse with each zero crossing. A time interval is determined between the detected zero crossings. The determined time interval is compared with a plurality of predetermined threshold values for generating a first decoded signal. The first decoded signal is utilized for generating a print signal. The print signal is applied to a conventional printer for generating both the facsimile chart and teletype message.

20 Claims, 5 Drawing Sheets

FACSIMILE AND RADIO TELETYPE BROADCAST SIGNAL DECODER

BACKGROUND OF THE INVENTION

The present invention relates to a broadcast signal decoder and more particularly to a method and apparatus for decoding a facsimile and radio teletype broadcast signals.

Radio-facsimile broadcasts of weather charts and satellite photographs are transmitted in a range between 2-30 MHz by an international network of short wave radio stations. Many of these broadcasts are provided for transmission to ships for maritime navigational purposes. To decode radio facsimile transmissions, a standard short wave receiver is set to receive single side band SSB signals in the upper side band USB. Information is encoded on the transmissions by a frequency shift modulation FM of a center frequency of about 1900 hertz with a frequency value for black of 1500 hertz and a frequency value for white of 2300 hertz with gray areas encoded between these extremes. The chart is transmitted one horizontal line at a time at a rate of 2 lines per second. The left edge of the chart is defined by a series of synchronization lines transmitted before the start of each map. These lines consist of forty (40) lines of 1500 hertz tone which is interrupted for a short period with 2300 hertz tone at the beginning of each line. These interruptions are used by the receiving equipment to define the edge of the map and synchronization is maintained by timing one half second for each line until the beginning of the next chart. The transmitting stations also send an index selection signal of alternating 1500 hertz and 2300 hertz for five seconds to define the start of the transmission and a five second transmission of alternating 1500 hertz and 2300 hertz signals followed by ten seconds of a continuous 1500 hertz signal to define the end of the transmission that may be used automatically turn the recording equipment on and off.

Known radio facsimile receivers include a standard short wave receiver and an analog facsimile recorder that typically requires chemically treated or coated paper for recording the facsimile weather charts and diagrams. Such analog facsimile recorders typically weigh ten pounds or more and are designed to operate from 115 volts AC with the power consumption of 30 watts or more.

SUMMARY OF THE INVENTION

Among the important objects of the present invention are to provide an improved method and apparatus for decoding both radio facsimile and radio teletype broadcast signals; to provide such method and apparatus that overcomes many disadvantages of the prior art systems; to provide such apparatus that is arranged for operation on a DC power supply and that has low power consumption requirements and to provide such method and apparatus for automatic operation at selected time intervals during the day.

Briefly, in accordance with the preferred embodiment of the invention, there are provided a method and apparatus for decoding a broadcast signal. The broadcast signal may be either a radio facsimile signal or a radio teletype signal. A zero crossing detector detects zero crossings of the broadcast signal and generates a pulse with each zero crossing. A time interval is determined between the detected zero crossings. The determined time interval is compared with a plurality of predetermined threshold values for generating a first decoded signal. The first decoded signal is utilized for generating a print signal. The print signal is applied to a conventional printer for generating both the facsimile chart and teletype message.

DESCRIPTION OF THE DRAWING

These and other objects and advantages of the present invention will become readily apparent upon consideration of the following detailed description and attached drawing, wherein.

DETAILED DESCRIPTION OF THE PREFERRED EMBODIMENT

Figures 1, 3K:
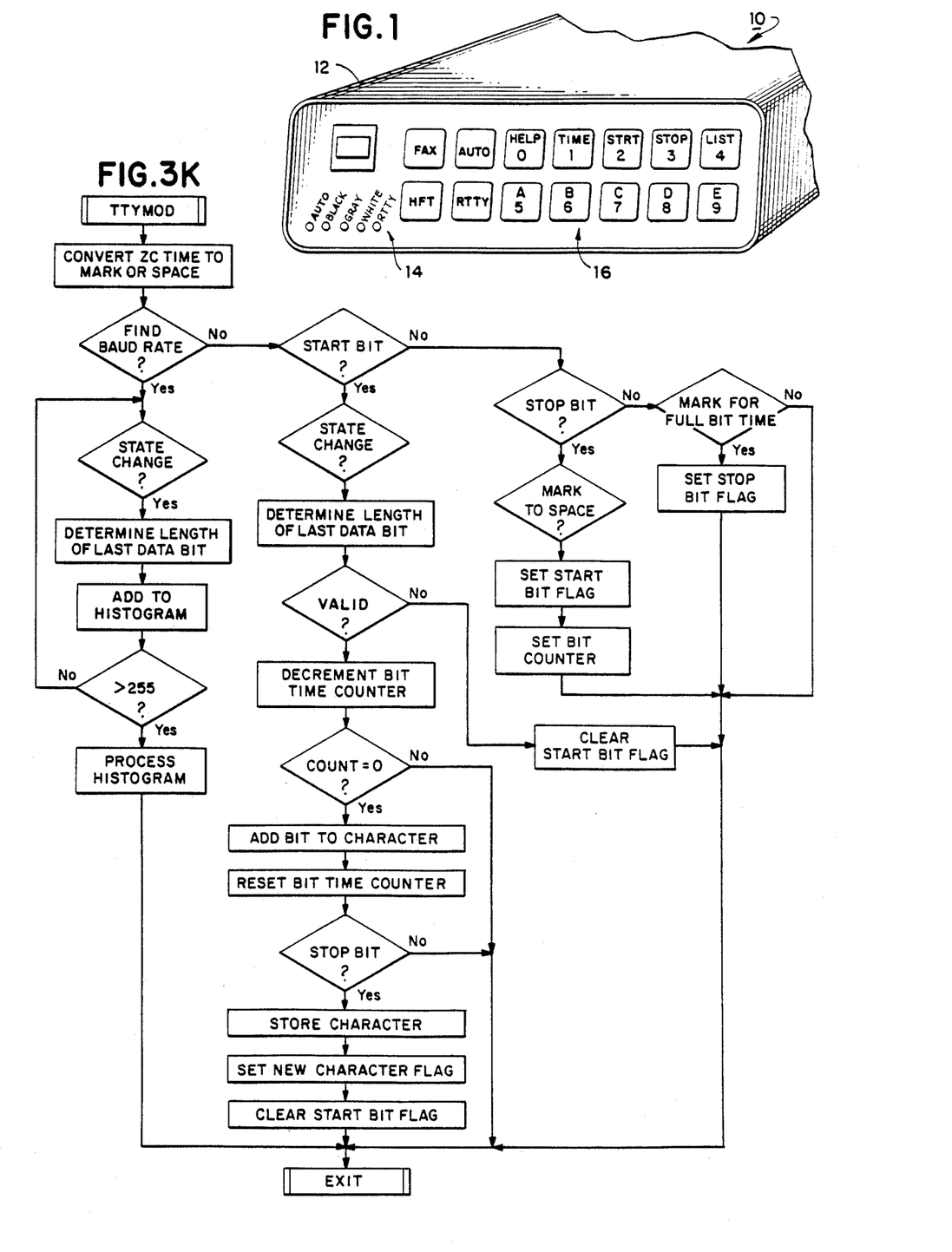
FIG. 1 is a perspective view of an embodiment of the facsimile radio teletype decoder apparatus according to the present invention.
FIGS. 3A-3K are flow charts illustrating the logical steps performed by the apparatus of FIG. 1.

Referring now to FIG. 1, there is illustrated one embodiment of a facsimile and radio teletype broadcase signal decoder apparatus according to the invention designated by the reference character 10 having a housing 12, a display 14 and a keyboard 16. Display 14 includes a plurality of light emitting diodes LED's for displaying operational mode data parameters. Keyboard 16 includes a plurality of keyswitches designated as FAX, AUTO, HFT and RTTY for selecting an operational mode of the decoder 10. A plurality of keyswitches 0-9 are manually operated for programming the decoder 10 for automatic operation during selected time intervals and for enabling the decorder 10 for printing stored informational instructions.

Figure 2:
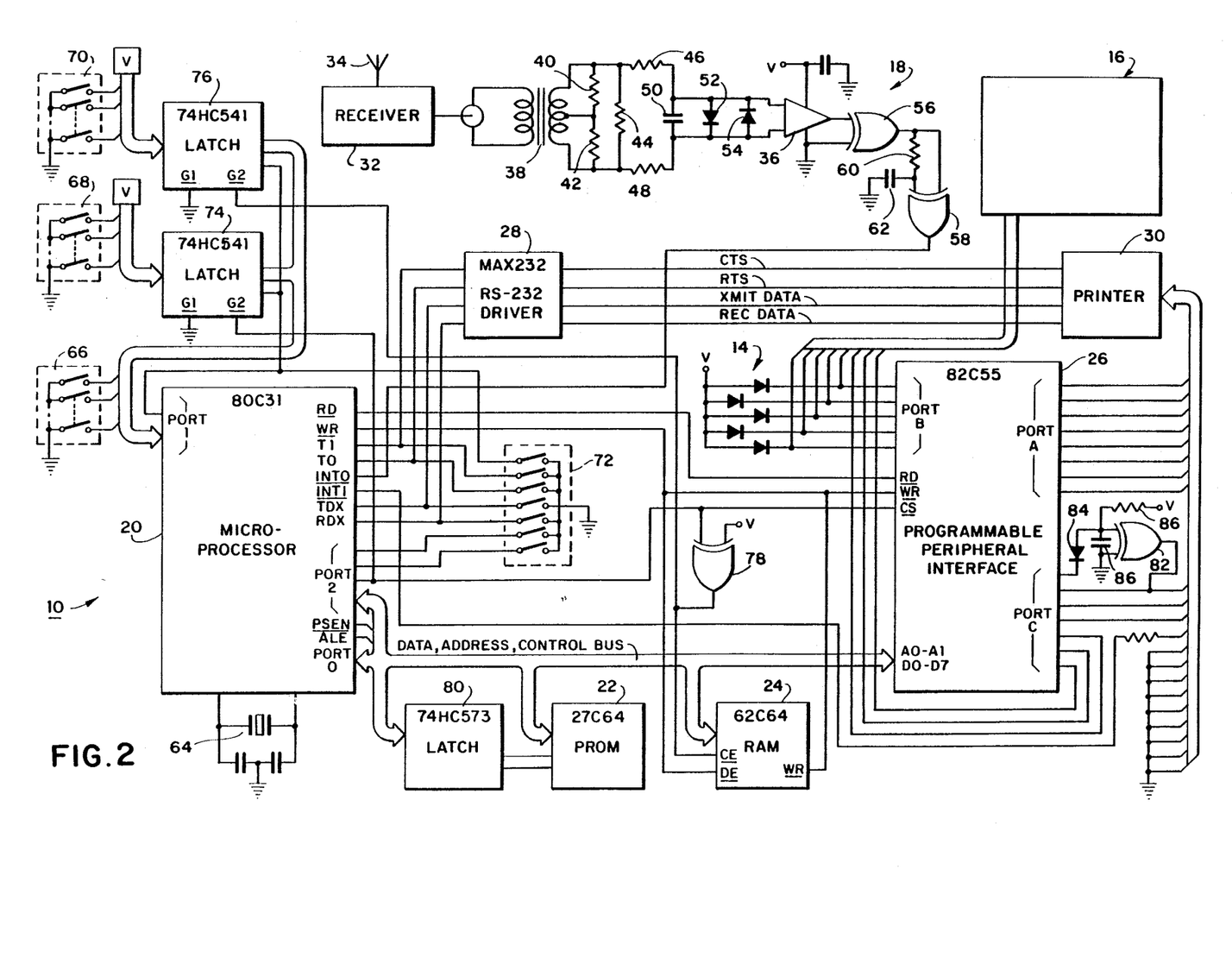
FIG. 2 is an electrical schematic and block diagram representation of the facsimile and radio teletype decoder apparatus of FIG. 1.

Referring to FIG. 2, there is shown an electrical schematic and block diagram representation of the facsimile and radio teletype decoder 10. Active LOW signals are shown and described with respect to FIG. 2 with a particular label for the signal underlined. As its major functional components, the decoder 10 includes a zero-crossing detector 18 for receiving an applied signal and for generating a pulse with each zero crossing of the received signal, a microprocessor 20 for performing logical operations in accordance with a stored program, a programmable read-only memory (PROM) 22 for storing a program for controlling the sequential operations of the decoder 10, a random-access memory (RAM) 24 for storing coded information, including time and operational selections entered via keyboard 16 and real-time data, a programmable peripheral interface 26 for interconnection with the display 14, the keyboard 16, an external parallel printer 30 and a printer driver 28 for driving an external serial printer 30. The decoder 10 includes a DC power supply designated as V that advantageously may be provided by batteries.

A radio receiver 32 that is coupled to a receiving antenna 34 is used in conjunction with the decoder apparatus 10 for tuning and receiving the selected broadcast signal, such as a broadcast facsimile, satellite photo or radio teletype signal. The radio receiver 32 is a SSB receiver tuned for the USB mode. An audio output of the receiver 32 is applied to the zero-crossing detector 18. The zero-crossing detector 18 includes a comparator 36, such as an integrated circuit device type CA3160 manufactured and sold by RCA Corporation.

The monitored signal is coupled to the inputs of the comparator 36 via a transformer 38 and a filter and biasing arrangement including a plurality of resistors 40, 42, 44, 46 and 48, and a capacitor 50, as shown. A pair of diodes 52 and 54 are oppositely connected between the inputs of comparator 36 for clamping the voltage potential therebetween. The output of the zero crossing detector configured comparator 36 is applied to an external interrupt port INT0 of the microprocessor 20 via a pair of series connected exclusive OR gates 56 and 58. A filter combination of a resistor 60 and a capacitor 62 is connected in series between the output of the exclusive OR gate 56 and ground and at their junction to an input of the exclusive OR gate 60.

An external crystal oscillator circuit 64 preferably supplies a periodic pulse source for driving an internal clock generator in the microprocessor 20. The external crystal oscillator circuit 64 has a basic oscillator frequency for example, in the range between 3.5–12MHz. Although various commercially available microprocessors having standard capabilities could be used for the microprocessor 20, a low power device such as a complimentary metal oxide semiconductor CMOS integrated circuit microprocessor preferably is used. For example, an Intel CHMOS integrated circuit device type 80C31 advantageously can be imployed for microprocessor 20. This device includes 128 bytes of internal data memory RAM, two multiple mode, 16-bit timer/counters, two external interrupts, one interrupt from each of the timer/counters and an interrupt from the serial port, thirty-two programmable input/output I/O lines (8-Bit Ports 0–4) and an 8-bit central processing unit CPU.

The 80C31 microprocessor includes a plurality of special functions registers including an accumulator ACC, a B register, a program status word PSW, a stack pointer SP, a data pointer DPTR, a timer/counter mode control TMOD, a timer/counter control TCON and a serial data buffer SBUF. Also, the 80C31 microprocessor includes a special function register for power control PCON to provide an internal idle mode operation of this CPU that allows the interrupt, serial port and timer blocks to continue to function while the clock to the CPU is halted. The idle mode operation is activated by software via the PCON register to provide further power reduction during the reduced activity mode. The 80C31 has separate address space for program memory and data memory. The 80C31 can be used with 64K bytes of both external RAM 24 and PROM 22. The 80C31 provides control signals for accessing the external memories 22 and 24 including program store enable PSEN and an address latch enable ALE for access to external program memory 22 and read RD or write WR for access to external data memory 24 and the PPI 26.

A plurality of manually operable switches 66, 68, 70 and 72 are coupled to the microprocessor 20 for enabling skew adjustment and for providing printer selections. Switches 66, 68, 70 and 72 may be multiple dip switches. The selected settings of the dip switch 66 is applied to the Port 1 inputs of microprocessor 20 with the selected setting of dip switch 72 applied to selected input/outputs of Port 2 and 3 including serial data input/output RXD and TXD, timer/counter 0 external input T0 and timer/counter 1 external input T1. Dip switches 68 and 70 are coupled to Port 1 of microprocessor 20 and to an input of dip switch 72, respectively via an octal tri-state latch 74 and 76. Latches 74 and 78 can be implemented with an integrated circuit octal buffer/line driver device type 74LS541 that includes enable inputs G1 and G2 and 3-state outputs. The 74LS541 provides a HIGH or LOW output corresponding to a HIGH or LOW data input with a LOW applied to both the G1 and G2 inputs. With a HIGH applied to either of the G1 or G1 inputs, a high impedance output results. The G1 input is not used for control and is connected to ground on both latches 74 and 76. An output of dual-input Exclusive OR date 78 is connected to the G2 input of latch 76. One input of the Exclusive OR gate 78 is connected to the supply voltage V and its other input is connected to the G2 input of latch 76, so that latch 74 or latch 76 is enabled. The active input to the Exclusive OR gate 78 is connected to the microprocessor Port 2.5 output.

A general purpose programmable I/O device is used for the PPI 26, such as an Intel CHMOS device type 82C55 that is compatible with the 80C31 microprocessor. The 82C55 provides 24 programmable I/O lines (8-Bit Ports A, B and C), a 3-state bidirectional 8-bit buffer for interface with the microprocessor data bus lines D0–D7 for transmitting or receiving data under the control of the CPU. The 82C55 includes a chip select CS input with an applied LOW signal enabling communication between the CPU and the 82C55. An applied LOW read RD input to the 82C55 enables the 82C55 to send data on status information to the CPU. An applied LOW write WR enable the CPU to write data or control words into the 82C55. A0 and A1 inputs, in conjunction with the RD and WR, control the selection of one of the three Ports A, B or C or the control word registers.

Port 2.5 control output of the microprocessor 20 is also applied also to a CS enable input of the PPI 26. The output of the Exclusive OR gate 78 is HIGH corresponding to an applied LOW enable CS input for the PPI 26 so that latch 74 profices a high impedance outputs and latch 76 is enabled. The output of the Exclusive OR gate 78 is applied to the chip enable CE input of RAM 24 with the device enable input DE connected to the microprocessor write WR control output.

A latch 80, such as an integrated circuit device type 74HC573 is coupled between Port 0 of microprocessor 20 and the PROM 22. Latch 80 is enabled by the microprocessor ALE control signal applied to a latch enable LE input of the 74HC573 via a bidirectional data, address and control bus, as shown. The microprocessor PSEN is applied to a device enable DE input of the PROM 22 with a chip enable CE input connected to ground. The Port 2 I/O lines of the microprocessor 20 are connected to the PROM 22, RAM 24 as shown by the data, address and control bus. The Port 0 I/O lines of the microprocessor 20 are connected to the PROM 22, RAM 24 and to the D0–D7 input of the PPI 26. The PPI 26 includes Port B0-5 connections to the keyboard 16 for sensing key switch entries and to the display LEDS 14 for driving the display. Port C0-3 of the PPI 26 are connected to the keyboard 16. Port A0-7 and Port C4-7 of the PPI 26 are arranged for driving the external parallel printer 30. An Exclusive OR gate 82 is coupled to the Port C7 of PPI 26 via a diode 84 as shown. A series connected resistor 86 and a capacitor 88 are connected between the positive supply +V and the ground and at their junction to the anode of diode 84. The component values of the resistor 86 and the capacitor 88 are selected to provide a sufficient pulse width for a synchronization strobe pulse for the external printer 30.

When the decoder 10 is first installed, the user connects either a parallel printer cable between the Port A and C outputs of the PPI 26 or a serial printer cable is connected between the outputs of the serial printer driver 28 and the external printer 30. The user manually adjusts the switch setting for either a parallel or serial printer configuration by manually setting, for example, dip switches 66 and 72.

In use, the user selects an operational mode of the decoder 10 by depressing one of the key switches HFT, FAX, RTTY, or AUTO of the keyboard 16. The receiver 32 is tuned to the desired broadcast transmission by the user. The display 14 provides visual indication for assisting in tuning the receiver 32. The display LEDS labeled WHITE, GRAY and BLACK indicate the darkness of the received facsimile transmission so that the darkness or lightness of a printed chart can be adjusted by using these tuning LEDS. Since facsimile charts are predominantly white, the receiver 32 is adjusted so that the WHITE LED is on most of the time. To print a lighter chart, the receiver 32 is tuned so that the WHITE LED is on more. Similarly, to print a darker chart, the receiver 32 is tuned so that the BLACK LED is on more.

For tuning a radio teletype broadcast transmission, the receiver 32 is tuned to the desired radio teletype frequency and adjusted so that the GRAY LED stays on. The GRAY tuned LED is on to indicate the reception and decoding of valid radio teletype character and remains on until an invalid character is detected that may be caused, for example, by noise or lack of signal strength. The GRAY LED will not turn on until the correct baud rate is selected. For a selected automatic operational mode, the LED labeled AUTO blinks on and off indicating the selected automatic set-up mode for programming the decoder 10 for automatic operation during a selected time interval.

Referring now to FIGS. 3A-3J, there shown flowcharts illustrating the program stored in the PROM 22 that is performed by the microprocessor 20 and provided in accordance with principles of the invention of the facsimile and radio teletype decoder 10.

Figures 3A, 3B, 3C:
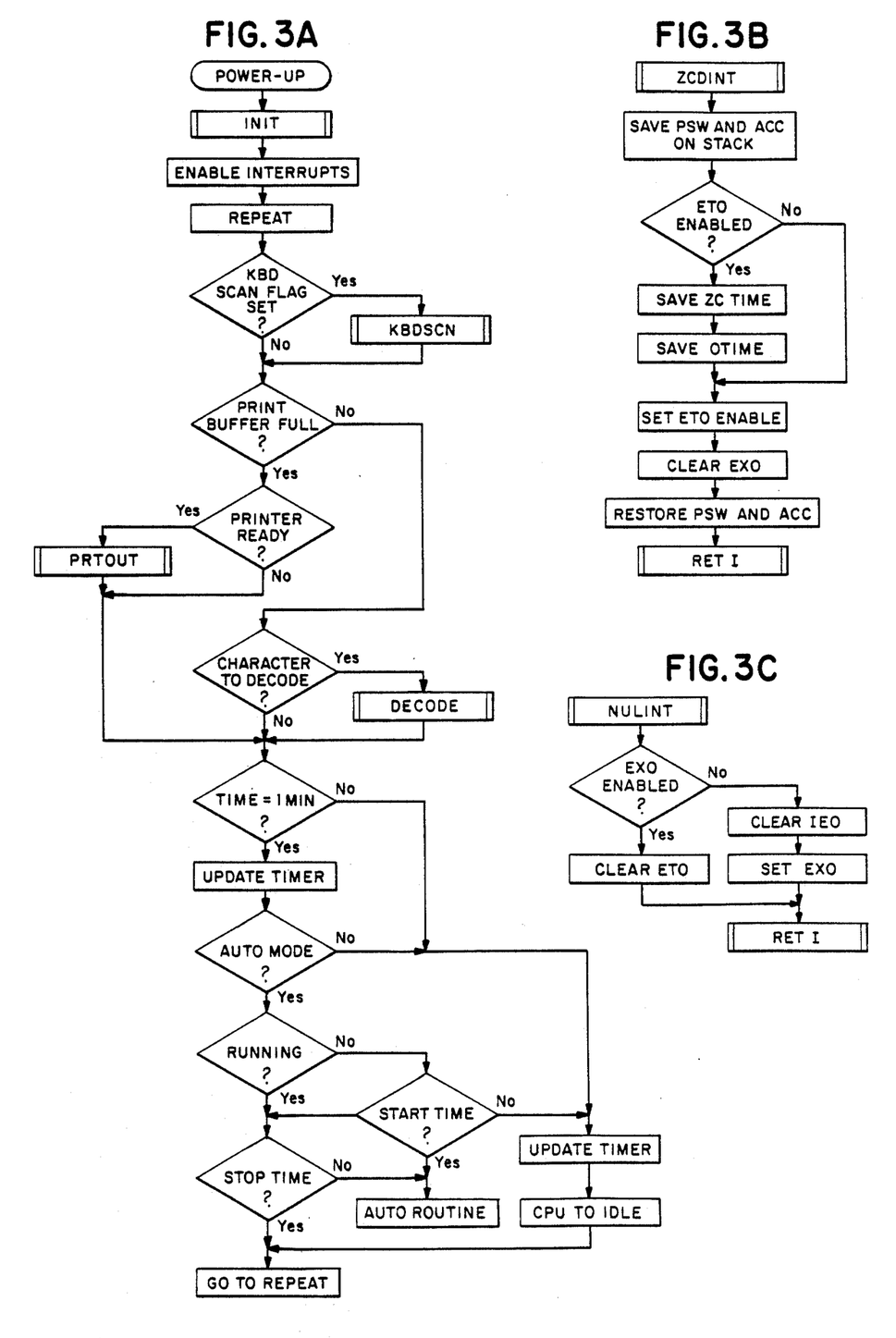

Referring initially to FIG. 3A, there is shown a flowchart illustrating an initialization and idle mode sequential operations performed by the microprocessor 20. The sequential operations begin with power-up of the facsimile and radio teletype broadcast signal decoder 10. An initialization subroutine is performed that includes clearing the internal RAM of the microprocessor 20, reading the printer configuration switch settings, accessing and initializing the PPI 26 and clearing the external RAM 24. Then the initialization sequential steps continues by waiting for an on line signal from the associated printer 30 and then a sign on message is printed. Initial values are loaded into the timer/counters and the timer mode control registers are set.

Figures 3D, 3E, 3F, 3G:
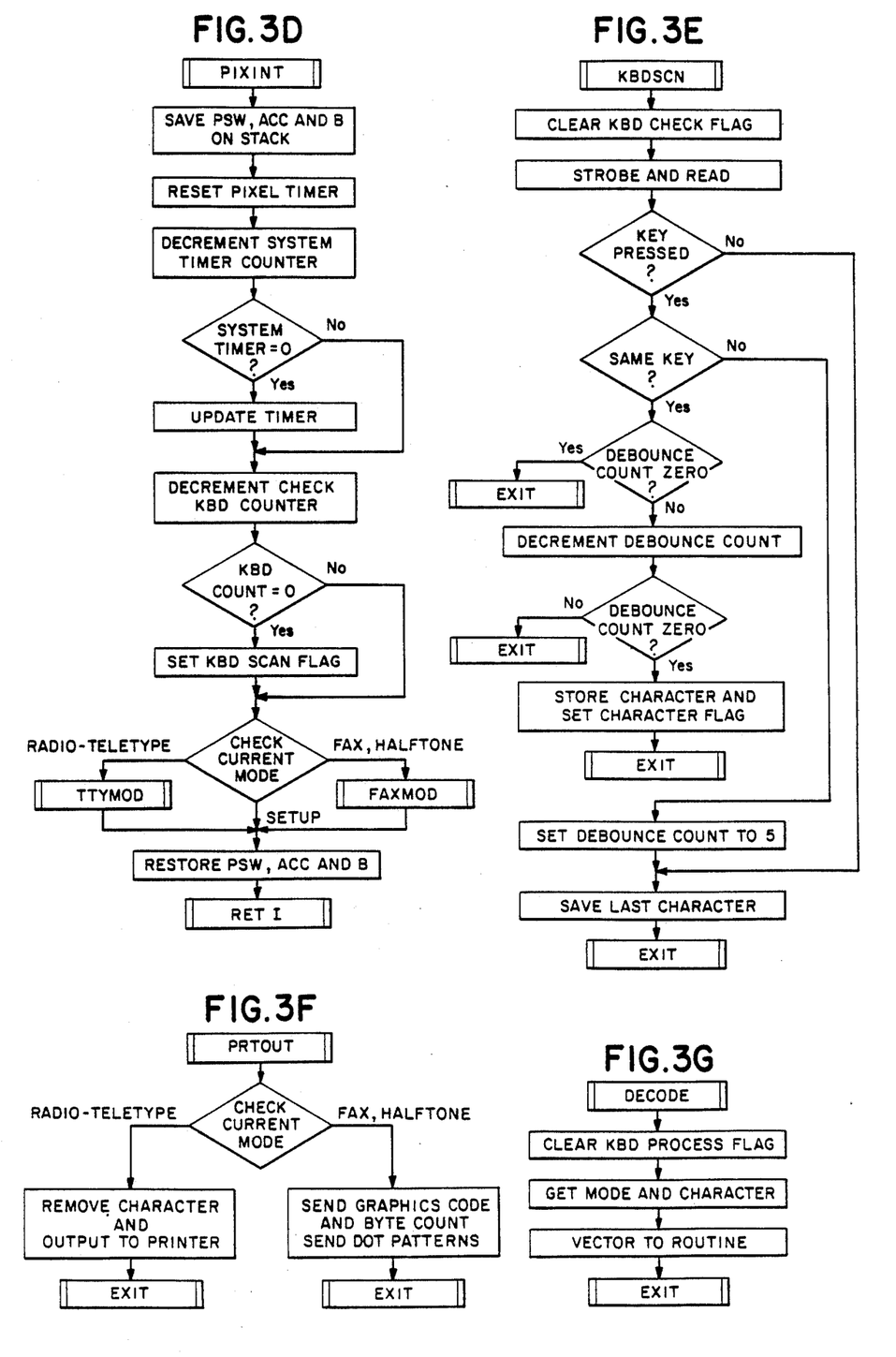

Next the microprocessor interrupts are enabled. FIGS. 3B and 3C illustrate interrupt service routines ZCDINT and NULINT that are performed for processing an external interrupt at INT0 from the zero crossing detector 18. An internal timer/counter 0 of the microprocessor 20 is used determining a time interval between detected zero crossings. FIG. 3D illustrates an interrupt service routine PIXINT that is performed for processing a pixel clock that determines a time separation between pixels in the output PRINT signals of the decoder 10. The interrupt service rountines are described with respect to FIGS. 3B, 3C and 3D.

The idle loop begins by checking a keyboard scan flag. If the keyboard scan flag is set, a keyboard scan KBDSCN subroutine is performed. The KBDSCN subroutine is illustrated and described with respect to FIG. 3E. Otherwise, a flag indicating that the printer buffer is full is imediately checked. If the buffer full flag is set, the printer busy flag is checked to determine if the printer is ready. If the printer is ready, a printout PRTOUT subroutine is performed. The PRTOUT subroutine is illustrated and described with respect to FIG. 3F.

Otherwise, when the printer buffer is not full, a keyboard character flag is checked to determine if there is a keyboard switch input character to decode. When there is a character to decode, a keyboard DECODE subroutine is performed. The DECODE subroutine is illustrated and described with respect to FIG. 3G. Otherwise, when either there is no character to decode, or the printer is not ready or after the PRTOUT subroutine is performed, the system timer count is checked to determine if it equals one minute. When the system timer count is less than one minute, then the display 14 is updated and the central processing unit CPU is set to the idle mode in order to minimize power consumption until the next interrupt occurs. Then the sequential operations are continued returning to repeat the before described operations. Otherwise when the system timer count equals one minute, then the system time is updated.

When in the automatic operational mode, then a check is made to determine if the system is now running. If it is not, an autostart table is scanned to determine if the current system time matches a start time. If a match is found, the programmed auto routine is then performed. Otherwise, if an auto subroutine is then running, then the autostart time table is scanned to determine if the current system time matches a stop time. If a match is found, the sequential operations then continue returning to the repeat. Otherwise, when the current system time does not match a program stop time, the auto routine is performed.

Referring now to FIG. 3B, there is shown an interrupt service ZCDINT routine for servicing an external interrupt from the zero crossing detector. The ZCDINT routine begins by saving the accumulator and PSW register contents on the stack. The contents of the low byte TL0 of timer/counter 0 is moved into the accumulator and then the TL0 timer is reset and any timer overflow high byte TF0 of timer/counter 0 is cleared. It is then determined if the timer zero in enabled by checking if the ET0 control is set. When timer 0 is enabled, then the contents of TL0 is saved that corresponds to the zero crossing time shown as ZC TIME. Then the prior zero crossing time or OTIME is saved. Then a null timer interrupt is enabled by setting ET0 control and the ZCD interrupt is disabled by clearing EX0 control. The ACC and PSW registers are restored and the sequential operations continue returning from the zero crossing detector interrupt.

Referring now to FIG. 3C. There is shown a null interrupt NULINT routine that provides a predetermined delay for filtering noise before enabling the ZCD interrupt after an external interrupt INT0 is received. The null interrupt routine begins by determining if the EX0 control is set that indicates the ZCD interrupt is enabled. If the ZCD interrupt is enabled, the timer interrupt is disabled by clearing ETO control. Otherwise, if the ZCD interrupt is not enabled, the interrupt edge flag IEO control is cleared and then the ZCD interrupt is enabled by setting EXO control. Then the sequential operations continue returning from the NULINT interrupt.

Referring now to FIG. 3D, there shown a pixel clock interrupt PIXINT routine. The PIXINT routine begins with saving the ACC, PSW and B registers on the stack. The pixel clock timer is then reset and the system timer/counter is decremented. If a zero count results, then the counter is reset and the system time is updated by one-half second. Next the keyboard check counter is decremented. When a zero count results the keyboard counter is reset and a keyboard scan flag is set. Then the current facsimile or teletype operational mode is then determined. When the current operational mode is the radio teletype operational mode, then a TTYMOD subroutine is performed as is illustrated and described with respect to FIG. 3K. Otherwise for the facsimile operational mode, a FAXMOD subroutine is performed. The FAXMOD subroutine is illustrated and described with resepct to FIG. 3H. Then the PSW, ACC and B registers are restored from the stack and the sequential operations continue returning from the interrupt.

Referring now to FIG. 3E, there is shown the KBDSCN subroutine that begins by clearing the keyboard check flag. Then the keyboard rows are strobed and the columns are read of the keyboard matrix to determine if a key was pressed. If a key was pressed, it is then determined if it was the same key as the last time. If so, then the debounce counter is checked to determine if the debounce counter is zero. If the debounce counter is zero, then the KBDSCN subroutine is exited. If the debounce counter is not zero, then the counter is decremented. Again it is determined if the debounce counter is zero. If a zero does not result, then the KBDSCN subroutine is exited. Otherwise, the character is stored in memory and a new character flag is set before exiting the KBDSCN subroutine.

Otherwise, when a key was not pressed then the last keyswitch character that was pressed is saved before exiting the KBDSCN subroutine. When it is determined that the key that was pressed was not the same as the last key pressed, then the debounce counter is set and the last character that was pressed is saved before exiting the KBDSCN subroutine.

Referring now to FIG. 3F, the PRTOUT subroutine begins by determining the current operational mode of the decoder 10. For a radio teletype operational mode, the coded ASCII character data is removed from the printer buffer, excessive line feed characters are removed and missing carriage returns or line feed characters are inserted before output of the character to the printer 30. Then the sequential operations are continued exiting the PRTOUT subroutine. Otherwise, for the facsimile FAX and Half-Tone operational mode, a graphics code and byte count are first sent to the printer 30. Then dot patterns are sent from the printer buffer expanding or contracting the data to fill the page according to the initial setup parameters for the printer 30. In the FAX mode adjacent dots in triple or quad density modes are not printed. After the dot patterns are sent to the printer 30, the PRTOUT subroutine is exited.

Referring now to FIG. 3G, there shown the keyboard DECODE subroutine. The subroutine begins by clearing the keyboard process flag that was set to indicate that there is a keyboard character to be processed. The current operational mode and value of the character are utilized to determine the action to be performed that is accomplished by vectoring to corresponding subroutine. For example, when in the automatic setup mode, when the help mode is then selected by depressing the HELP keyswitch, a stored instruction list is output to the printer 30 and then printed, as shown in the following Table 1.

TABLE 1

| Key | Function |
|---|---|
| AUTO | Return to AUTO setup mode |
| 5(A) | List of frequencies |
| 6(B) | How to switch modes |
| 7(C) | How to move sync edge |
| 8(D) | How to change contrast |
| 9(E) | How to change baud rate |

Thereafter, for example, when the key switch 8D is depressed, the following stored instruction list shown in Table 2 is printed.

TABLE 2

To change the contrast level the unit must be in the HFT mode. The contrast increases from left to right with 5(A) the lowest contrast and 9(E) the highest contrast. The default contrast for HFT mode is 6(B).

TABLES 1 and 2 are exemplary of various stored instructions for assisting the user of the decoder 10.

Figures 3H, 3J:
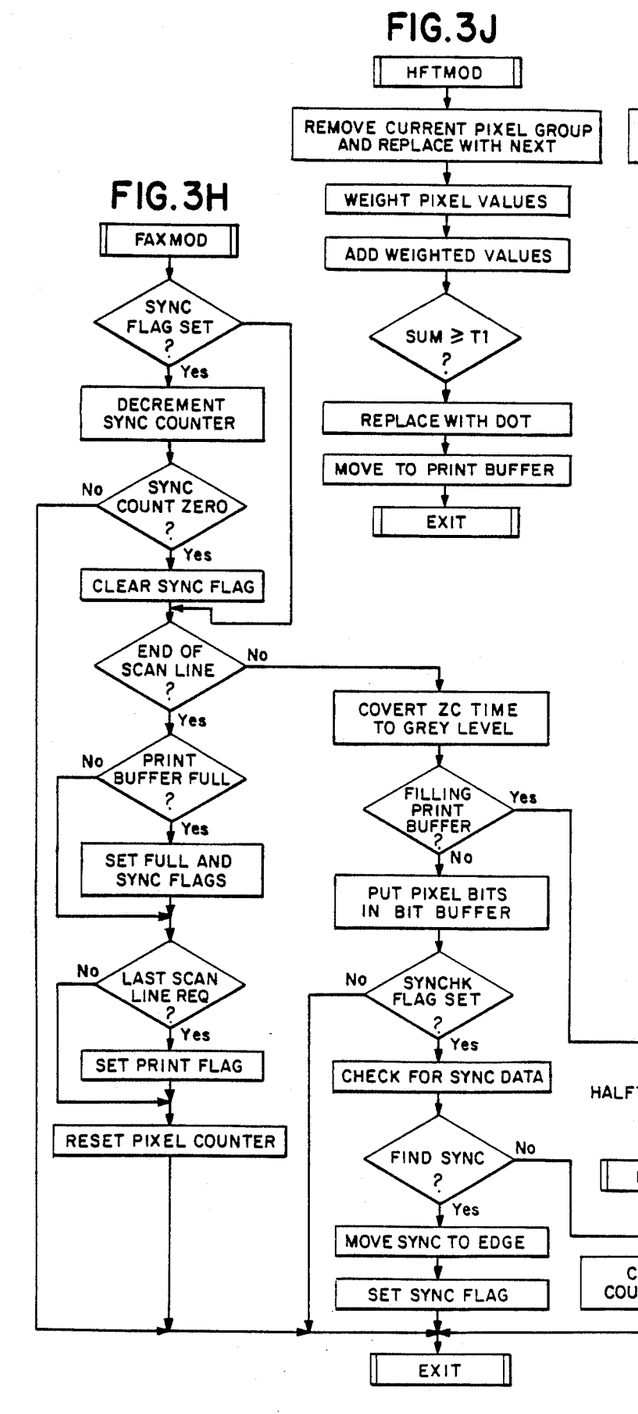

Referring to FIG. 3H, there is shown a flowchart illustrating the sequential steps performed for the facsimile operational mode. The FAXMOD subroutine begins by determining if the sync flag is set. If set, the sync counter is decremented. When a zero does not result, the FAXMOD subroutine is exited. Otherwise, when a zero results the sync flag is cleared.

Then a check is made to determine if this is the end of the scan line. If so, the printer buffer is checked to determine if it was filled during the last scan line. If the printer buffer was filled, the printer buffer full and sync flags are set. Otherwise, if the printer buffer is not full or after the sync and full flags have been set, it is determined if this was the last scan line required to make a print line. If so, a set print flag is set indicating that the printer buffer should be filled during the next scan line. Otherwise, the pixel counter is reset for the number of pixels needed for the new scan line before the FAXMOD subroutine is exited.

Otherwise, when not at the end of the scan line, the zero crossing ZC time is converted to a gray level value, for example, such as, a value from zero to seven. Then it is determined if the printer buffer is being filled. If not, the gray level value or pixel bits are moved into the 2K byte 3-bit deep pixel data buffer. Then the sync check flag is checked. If the sync check flag is set, then a check is made for the sync pattern in the pixel data buffer. If the sync pattern is found, the sync count is set to move the sync pattern to the edge of the print pixel data. Then the sync flag is set and the FAXMOD subroutine is then exited.

Otherwise, if the printer buffer is being filled, the current facsimile operational mode is then determined. When in a line print mode, a LINMOD subroutine is performed that is illustrated and described with respect to FIG. 3I. Otherwise, for the half-tone print mode, a HFTMOD subroutine is performed that is illustrated and described with respect to FIG. 3J. Then the sequential operations continue after exiting the FAXMOD subroutine.

Figure 3I:
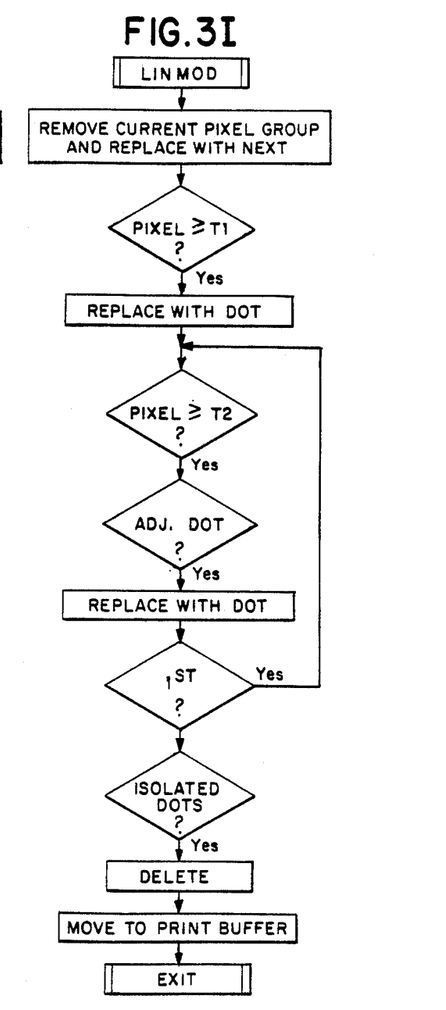

Referring now to FIG. 3I, the LINMOD subroutine begins with removing a group of 8 3-bit pixels at the current pixel location and replacing the removed pixels with the current 3-bit value which will be the top line of the next printer buffer. The gray level pixel values are converted to dots by first comparing the gray level value with a predetermined first threshold value for example, equal to six or seven. If the pixel value is greater than or equal to this first threshold value, then the gray level is replaced with a printed dot. Then the gray level pixel value is compared to a second predetermined threshold value for example, from two to five. If the pixel value is greater than or equal to the second threshold value and there is an adjacent printed dot, then the pixel value is replaced with a printed dot. Otherwise, the pixel value is ignored or left blank. The pixel value is again compared to the second predetermined threshold value and is again replaced with a printed dot for pixel values greater than the second threshold value and adjacent printed dot is found. These repeated sequential steps fill in gaps in the resulting line drawings. Then isolated printed dots are identified and deleted for image enhancement of the line drawings. The printed dots are then moved to the printer buffer and the LINMOD subroutine is exited.

Referring now to FIG. 3J, the HFTMOD subroutine similarly begins with removing the group of pixels at the current pixel location and replacing it with the current 3-bit value that will be the top line of the next printer buffer. The gray levels are converted to printed dots by first weighting the gray level values for example, such as by setting 0=0, 1=1, 2=2, 3=3, 4=4, 5=7, 6=10, and 7=15. The weighted values of each gray level is then added to a counter for the respective scan line. When the resulting counter value exceeds a predetermined threshold value for example, 16, a dot is output for that scan line at the current pixel location and then the predetermined threshold value is subtracted from the counter. The printed dot data is moved to the printer buffer and the HFTMOD subroutine in exited. Performing this HFTMOD subroutine produces a gray shaded print image particularly useful for satellite photographs.

Referring now to FIG. 3K, there is shown a flowchart illustrating the sequential operations for the teletype operational mode. The TTYMOD subroutine begins by converting the zero crossing ZC time to a mark or space. A median filter is then performed utilizing the ZC time and 0 TIME for noise reduction. Then it is determined if a baud rate check is required. If so, a state change from a mark to a space or from a space to a mark is identified. Then the length of the last data bit is determined and added to a histogram of bit lengths. After 255 values have been added to the histogram, a flag is set to process the histogram and the TTYMOD subroutine is exited.

Otherwise, when a baud rate check is not required, then it is determined if a start bit has been found. If found, a state change from either a mark to a space or a space to a mark is identified, then the length of the last data bit is determined. A check is then made to determine if the length of the last data bit is valid. If valid, the start bit flag is cleared, and the TTYMOD subroutine is exited. Otherwise, if valid, then a bit time counter is decremented and if the result is not zero, then the TTYMOD subroutine is exited.

Otherwise, when a zero results from decrementing the bit time counting, then the current bit value is added to the character being assembled and the bit time counter is reset. Then if a valid stop bit is found, then the character is stored and a new character flag is set indicating that a new character was received. The start bit flag is cleared before the TTYMOD subroutine is exited.

Otherwise, when the start bit was not found, a check is made for a stop bit. If a stop bit is been found, then if a state change from a mark to space is identified, the start bit flag and bit counter are set before exiting the TTYMOD subroutine. Otherwise, when a stop bit is not found, then it is determined if the state has been in a mark level for one full bit time. If so, the stop bit flag is set before exiting the TTYMOD subroutine otherwise the subroutine is imediately exited.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Apparatus for decoding a broadcast signal comprising:
   zero crossing detector means for detecting zero crossings of the broadcast signal;
   means responsive to said zero crossing detector means for determining a time interval between said detected zero crossings;
   comparator means for comparing said determined time interval with a plurality of predetermined threshold values for generating a first decoded signal; and
   means for processing said generated first decoded signal and for generating a PRINT signal.

2. Apparatus as recited in claim 1 wherein said zero crossing detector means includes a comparator configured for generating a pulse with each zero crossing of the broadcast signal.

3. Apparatus as recited in claim 2 wherein said means responsive to said zero crossing detector means for determining a time interval between said detected zero crossings includes a microprocessor, said microprocessor including an oscillator clock signal, a first timer/counter for accumulating a count of said oscillator clock signal, an external interrupt input coupled to said zero crossing detector means for receiving said pulse and program means responsive to said received pulse for saving said accumulated count for determining said time interval.

4. Apparatus as recited in claim 3 further comprising delay means for providing a predetermined delay time interval responsive to said received pulse, said delay means arranged for disabling said program means for said predetermined delay time interval.

5. Apparatus as recited in claim 1 further comprising manually operable means for selecting one of a plurality of operational modes of the decoding apparatus.

6. Apparatus as recited in claim 5 wherein said manually operable means include keyboard switch means operable for selectively providing one of a facsimile operational mode, a halftone facsimile operational mode and a teletype operational mode of the decoding apparatus.

7. Apparatus as recited in claim 6 further including keyboard switch means manually operable for selectively providing an automatic operational mode for programmed operation both in a selected operational mode and during a selected time interval.

8. Apparatus as recited in claim 5 wherein said manually operable means include second switch means manually operable for selectively providing one of a parallel and a serial printer configuration setting.

9. Apparatus as recited in claim 5 wherein said comparator means for comparing said determined time interval with a plurality of predetermined threshold values for generating a first decoded signal includes means responsive to said selected operational mode for selectively comparing predefined ones of said plurality of predetermined threshold values.

10. Apparatus as recited in claim 5 wherein said means for processing said generated first decoded signal and for generating a PRINT signal includes means responsive to said selected operational mode for selectively generating one of a dot pattern graphics data PRINT signal and an ASCII coded character PRINT signal.

11. Apparatus as recited in claim 1 further comprising display means for displaying operational mode parameter data of the decoding apparatus.

12. Apparatus for decoding a broadcast signal comprising:
memory means for storing a program;
a microprocessor for performing said stored program;
zero crossing detector means for detecting zero crossings of the broadcast signal;
said microprocessor being responsive to said zero crossing detector means for determining a time interval between said detected zero crossings;
said microprocessor being operative for comparing said determined time interval with a plurality of predetermined threshold values for generating a first decoded signal; and
said microprocessor being operative for processing said generated first decoded signal and for generating a PRINT signal.

13. Apparatus as recited in claim 12 further comprising memory means for storing data.

14. Apparatus as recited in claim 12 wherein said zero crossing detector means includes a comparator configured for generating a pulse with each zero crossing of the broadcast signal.

15. Apparatus as recited in claim 14 wherein said microprocessor includes an oscillator clock signal, a first timer/counter for accumulating a count of said oscillator clock signal, an external interrupt input coupled to said zero crossing detector means for receiving said pulse and program means responsive to said received pulse for saving said accumulated count for determining said time interval.

16. Apparatus as recited in claim 15 wherein said microprocessor includes control means for enabling said first timer/counter and said stored program including means for providing a predetermined time delay responsive to said received pulse for enabling said first timer/counter after said predetermined time delay.

17. Apparatus as recited in claim 12 wherein said microprocessor further includes timer/counter means for generating a timing signal for processing said generated first decoded signal.

18. A method for decoding a broadcast signal comprising the steps of:
detecting zero crossings of the broadcast signal;
determining a time interval between said detected zero crossings;
comparing said determined time interval with a plurality of predetermined threshold values and generating a first decoded signal; and
processing said generated first decoded signal and generating a PRINT signal.

19. A method as recited in claim 18 wherein the step of determining a time interval between said detected zero crossings further includes the step of providing a predetermined time delay responsive to said detected zero crossing and ignoring detected zero crossings during said predetermined time delay.

20. A method as recited in claim 18 wherein said step of processing said generated first decoded signal and generating a PRINT signal includes the steps of identifying isolated printed dots and eliminating said identified isolated printed dots from said PRINT signal.

* * * * *